United States Patent
Ogawa et al.

(10) Patent No.: US 10,142,169 B2
(45) Date of Patent: Nov. 27, 2018

(54) DIAGNOSIS DEVICE, DIAGNOSIS METHOD, AND NON-TRANSITORY RECORDING MEDIUM STORING DIAGNOSIS PROGRAM

(71) Applicant: FUJITSU LIMITED, Kawasaki-shi, Kanagawa (JP)

(72) Inventors: Junichi Ogawa, Tachikawa (JP); Tsukasa Kinjo, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 15/358,180

(22) Filed: Nov. 22, 2016

(65) Prior Publication Data

US 2017/0207952 A1    Jul. 20, 2017

(30) Foreign Application Priority Data

Jan. 19, 2016   (JP) .................................. 2016-007965

(51) Int. Cl.
H04L 12/24 (2006.01)
H04L 12/26 (2006.01)

(52) U.S. Cl.
CPC .......... *H04L 41/0677* (2013.01); *H04L 41/14* (2013.01); *H04L 43/0817* (2013.01)

(58) Field of Classification Search
CPC .................. H04L 41/0677; H04L 41/14
See application file for complete search history.

(56) References Cited

U.S. PATENT DOCUMENTS

| | | | |
|---|---|---|---|
| 8,190,790 B1* | 5/2012 | Ogawa | H04L 45/02 370/252 |
| 2004/0167978 A1 | 8/2004 | Kitayama | |
| 2007/0087615 A1* | 4/2007 | Paulsen | H04L 12/2697 439/378 |
| 2007/0294572 A1* | 12/2007 | Kalwitz | G06F 11/0727 714/5.11 |
| 2008/0010530 A1* | 1/2008 | Davies | G06F 11/0727 714/31 |
| 2011/0191637 A1* | 8/2011 | Wight | G06F 11/00 714/43 |
| 2011/0191644 A1* | 8/2011 | Oldfield | G06F 11/00 714/704 |
| 2015/0016498 A1* | 1/2015 | Yamasaki | H04L 25/03057 375/233 |

FOREIGN PATENT DOCUMENTS

| | | |
|---|---|---|
| JP | 2004-207878 | 7/2004 |
| JP | 2009-540436 | 11/2009 |
| WO | 2007/146515 | 12/2007 |

* cited by examiner

*Primary Examiner* — Peter P Chau
(74) *Attorney, Agent, or Firm* — Fujitsu Patent Center (57) ABSTRACT

A diagnosis device includes: a processor that executes a diagnosis program; and a memory that stores the diagnosis program, wherein the processor, based on the diagnosis program, performs operations to: collect a data transmission variable set by a data transmission path characteristics from a transceiver device on a diagnosis target path; and perform diagnosis for the diagnosis target path with reference to diagnosis reference information that includes a value of the data transmission variable and determination information associated with each other, based on collected data transmission variable.

12 Claims, 8 Drawing Sheets

DIAGNOSIS DEVICE, DIAGNOSIS METHOD, AND NON-TRANSITORY RECORDING MEDIUM STORING DIAGNOSIS PROGRAM

CROSS-REFERENCE TO RELATED APPLICATION

This application is based upon and claims the benefit of priority of the prior Japanese Patent Application No. 2016-007965, filed on Jan. 19, 2016, the entire contents of which are incorporated herein by reference.

FIELD

The embodiments disclosed herein are related to a diagnosis device, a diagnosis method, and a non-transitory recording medium storing a diagnosis program.

BACKGROUND

In a storage system, a disk controller and a disk enclosure are coupled to each other through a cable.

A technology in the related art is disclosed in Japanese National Publication of International Patent Application No. 2009-540436 or Japanese Laid-open Patent Publication No. 2004-207878.

SUMMARY

According to an aspect of the embodiments, a diagnosis device includes: a processor that executes a diagnosis program; and a memory that stores the diagnosis program, wherein the processor, based on the diagnosis program, performs operations to: collect a data transmission variable set by a data transmission path characteristics from a transceiver device on a diagnosis target path; and perform diagnosis for the diagnosis target path with reference to diagnosis reference information that includes a value of the data transmission variable and determination information associated with each other, based on collected data transmission variable.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A male connector formed at one end of the cable, for example, is inserted into a female connector formed on the disk controller, and a male connector formed at the other end of the cable is inserted into a female connector formed on the disk enclosure, thereby coupling the disk controller and the disk enclosure to each other through the cable.

In such a storage system, the cable may be damaged due to insertion and removal and the like of the connector, and the transmission signal quality may deteriorate as the cable degrades over time, causing a failure attributable to the cable (hereinafter referred to as a cable failure) to occur.

In the storage system, occurrence of a cable failure is determined by detecting an abnormality in data transfer. Therefore, path diagnosis may not be capable of being performed without affecting operation of a business system or the like. A diagnosis device that performs path diagnosis without affecting the system operation, for example, may be provided to the storage system.

Figure 1:
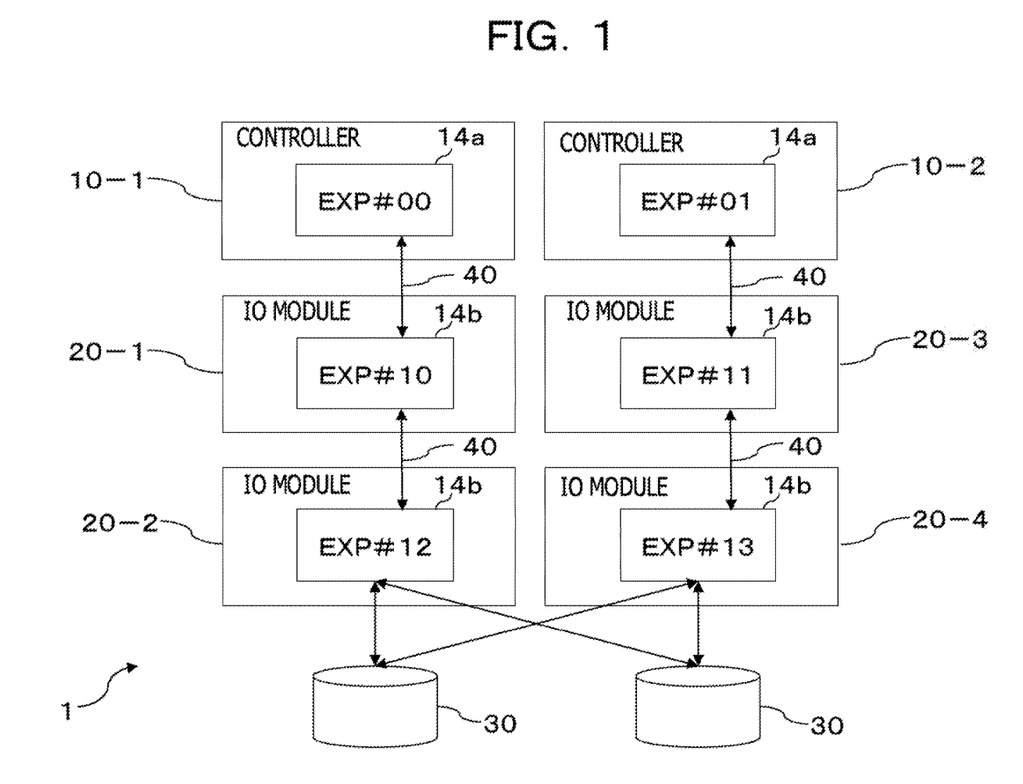
FIG. 1 illustrates an example of a storage system.
Figure 2:
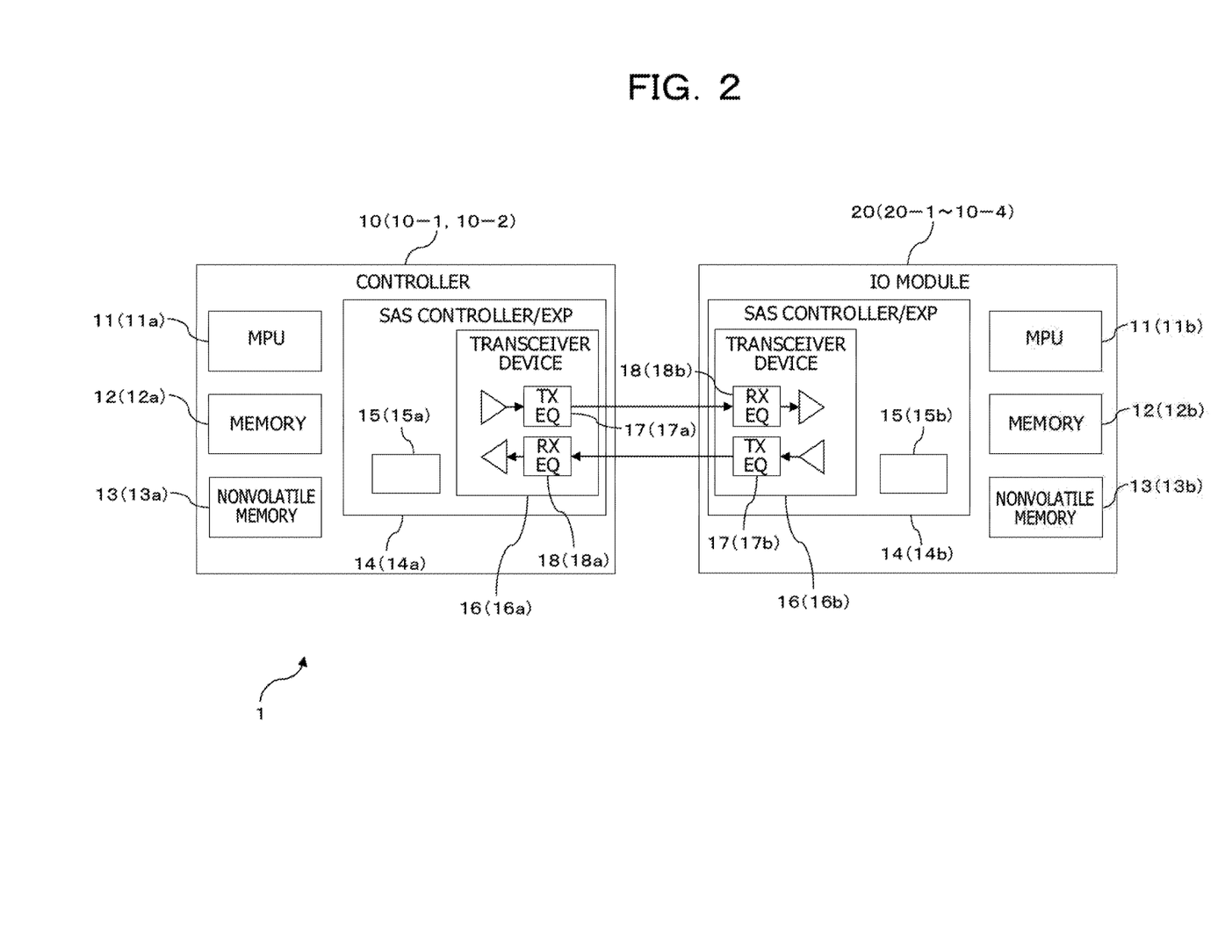
FIG. 2 illustrates an example of a hardware configuration of a controller and an input output (IO) module of the storage system.
Figure 3:
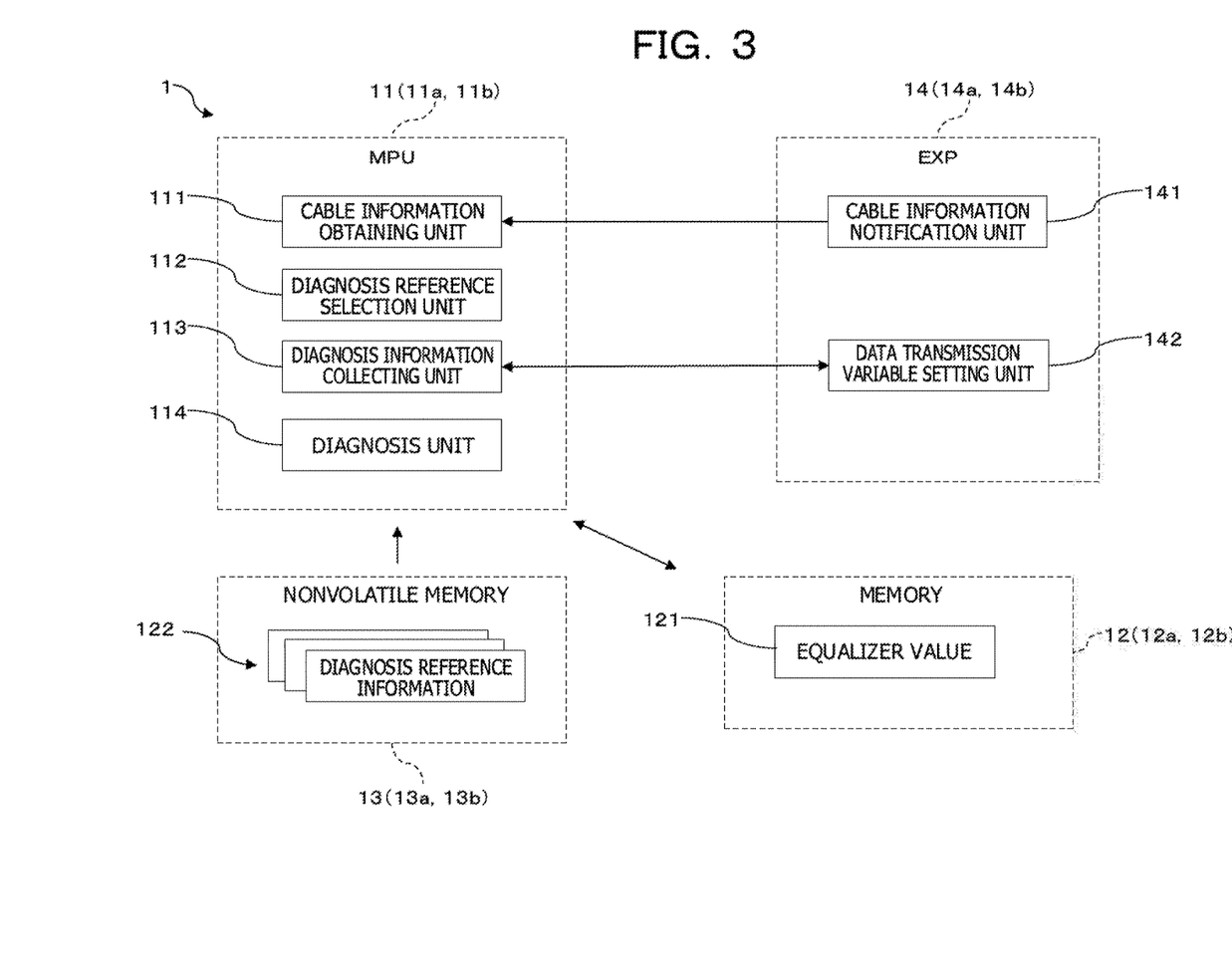
FIG. 3 illustrates an example of a function configuration of the controller and the IO module of the storage system.

FIG. 1 illustrates an example of a storage system. FIG. 2 illustrates an example of a hardware configuration of a controller and an input output (IO) module of the storage system. FIG. 3 illustrates an example of a function configuration of the controller and the IO module of the storage system. As illustrated in FIG. 1, a storage system 1 includes one or more (two in FIG. 1) controllers 10-1 and 10-2, one or more (four in FIG. 1) IO modules 20-1 to 20-4, and one or more (two in FIG. 1) storage devices 30.

Hereinafter, as a reference numeral indicating a controller, a reference numeral 10-1 or 10-2 is used for identifying one of the plural controllers, and a reference numeral 10 is used when a reference is made to any arbitrary controller. Similarly, hereinafter, as a reference numeral indicating an IO module, a reference numeral 20-1, 20-2, 20-3, or 20-4 is used for identifying one of the plural IO modules, and a reference numeral 20 is used when a reference is made to any arbitrary IO module.

The storage system 1 forms a virtual storage environment by virtualizing the storage devices 30. The storage system 1 provides a virtual volume to a host device which is a higher-level device. The storage system 1 executes data reading and writing processing and the like for a storage device 30 corresponding to the volume, in response to an input/output request, such as a read command or a write command for example, issued to the volume by the host device. The input/output request from the host device may be referred to as an IO command or an IO request.

The storage device 30 may be a storage device such as a hard disk drive (HDD) or a solid state drive (SSD), and stores various data. For example, redundant arrays of inexpensive disks (RAID) may be configured using plural storage devices 30. The controller 10-1 is coupled to the IO module 20-1, and the IO module 20-1 is coupled to the IO module 20-2. The IO module 20-2 is coupled to each of the two storage devices 30. The controller 10-1 may be connected, for example, to the IO modules 20-1, 20-2 and the storage devices 30 by cascade connection (multi-stage connection).

Similarly, the controller 10-2 is coupled to the IO module 20-3, and the IO module 20-3 is coupled to the IO module 20-4. The IO module 20-4 is coupled to each of the two storage devices 30. The controller 10-2 may be connected, for example, to the IO modules 20-3, 20-4 and the storage devices 30 by cascade connection. The controllers 10-1 and 10-2 may have configurations substantially the same as or similar to each other.

Each of the controllers 10 includes an expander chip 14a, and each of the IO modules 20 includes an expander chip 14b. The expander chip 14a and the expander chip 14b, and the expander chip 14b and the other expander chip 14b are, respectively coupled to each other through a communication cable 40. The communication cable 40 may be, for example, a serial attached small computer system interface (SAS) communication cable manufactured in accordance with the SAS standard.

A read only memory (ROM) in which the same cable information is stored may be mounted on each of the connectors formed at both ends of the communication cable 40. The controller 10 and the IO module 20 may read from the ROM and check the cable information on the communication cable 40. The cable information on the communication cable 40 may be unique information used for identifying an individual cable within the same function and specification component type ratings out of various kinds of communication cables. The cable information may be information (specification information, type information, unique information) that enables transmission characteristics such as cable length, thickness, type, and specification of the communication cable 40 to be determined. A serial number may be used as the cable information, for example. The cable information may be also referred to as unique information or a serial number.

The controller 10 may be a control device (storage control device, information processing device) that controls operation in the storage system 1. The controller 10 performs various types of control such as data access control of the storage device 30 in response to an IO command transmitted from the host device. The controller 10 transmits and receives data to and from the storage device 30 through one or more (two in FIG. 1) IO modules 20. For example, the controller 10 transmits and receives data to and from the IO module 20.

The controller 10 may include a diagnosis function to diagnose a data transmission path (diagnosis target path) through which data is transmitted and received between the controller 10 and the IO module 20. For example, the controller 10 may function as a diagnosis device that diagnoses the diagnosis target path. The same reference numeral in the drawings indicates the same or substantially the same part, such that the detailed description thereof may be omitted hereinafter.

As illustrated in FIG. 2, the controller 10 includes a micro-processor unit (MPU) 11a, a memory 12a, a nonvolatile memory 13a, and the expander chip 14a. The memory 12a may be a storage memory including a ROM and a RAM. For example, software programs related to storage control and data transmission/reception control as well as the data for the programs are written in the ROM of the memory 12a. A software program related to a data transmission path diagnosis function (diagnosis program) and the data for the program are also written in the ROM.

The software program in the memory 12a is read to the MPU 11a and executed as appropriate. The RAM of the memory 12a is a storage device that temporarily stores various data and programs, and includes a memory area and a cache area. The cache area temporarily stores data that has been received from the host device and data to be transmitted to the host device. In the memory area, the data and the programs are temporarily stored and expanded for use when the MPU 11a executes a program.

A value of an equalizer variable collected by a diagnosis information collecting unit 113 is stored in the RAM as an equalizer value 121. The nonvolatile memory 13a is a storage device that stores programs to be executed by the MPU 11a, various data, and the like. Diagnosis reference information 122 is stored in the nonvolatile memory 13a.

The expander chip (EXE) 14a is a relay device that performs relay functions between the controller 10 and the IO module 20, and transfers data based on the host device IO command. For example, the expander chip 14a transmits and receives data in accordance with the SAS standard. As illustrated in FIG. 2, the expander chip 14a includes a transceiver device 16a and a register 15a.

The communication cable 40 inserted into the connector is coupled to the transceiver device 16a. The transceiver device 16a performs data transmission and reception through the communication cable 40, and may correspond to a circuit device that includes a transmission (TX) equalizer 17a and a reception (RX) equalizer 18a. The transmission equalizer 17a may be, for example, a finite impulse response (FIR) type digital filter (FIR filter) having three taps.

The reception equalizer 18a is a FIR filter having n taps. The controller 10 accesses the IO module 20 through the expander chip 14a. One or more IO modules 20, tied in a row, are coupled to the controller 10 through the expander chip 14a. The expander chip 14a has a function to read cable information from the ROM of the communication cable 40 coupled to the connector. The expander chip 14a notifies the unique information on the communication cable 40 that has been read, for example the cable information, to the MPU 11a, for example, the cable information obtaining unit 111 thereof.

For example, when the expander chip 14a receives a request from the MPU 11a to transmit the cable information, the expander chip 14a transmits the cable information read from the ROM of the communication cable 40 to the MPU 11a, together with the information for identifying the connector. The expander chip 14a may notify the cable information to the MPU 11a, alternatively by storing the cable information read from the ROM of the communication cable 40 in the storage device such as the register 15a, and setting the stored cable information in a state readable by the MPU 11a.

For example, the expander chip 14a has a function of a cable information notification unit 141 that notifies the MPU 11a, for example, the cable information obtaining unit 111 thereof, of the cable information on the communication cable 40. The expander chip 14a has a function to set a variable of the transmission equalizer 17a of the transceiver device 16a, for example, an equalizer variable, according to the characteristics of the data transmission path. Hereinafter, a value of an equalizer variable may be referred to as an equalizer value. The processing for setting an equalizer variable may be referred to as the transmission equalizer variable determination processing. The equalizer value may correspond to a data transmission variable set according to the characteristics of the data transmission path.

The variable determination processing by the transmission equalizer may be determined in the link initialization processing by the transceiver device 16a. The link initialization processing may be executed, for example, when the power source of the device is turned on or when the communication cable 40 is removed and inserted. Hereinafter, the variable determination processing of the transmission equalizer may be referred to as the link training or the equalizer training.

The link training is performed by transmitting waveforms between the transceiver device 16a of the controller 10 and its transmission destination transceiver device 16b of the IO module 20, to each other. The transceiver device 16a (16b) on the reception side instructs, according to the received waveform shape, the transceiver device 16b (16a) on the transmission side to increase or decrease the value of the transmission equalizer variable such that the waveform shape is changed.

The equalizer variable on the transmission side is finally determined according to the transmission path characteristics of the transceiver devices 16a and 16b, due to the link training being performed continuously for a certain period of time. The communication in a state maintaining a certain waveform quality level is thus achieved in the communication path between the transceiver device 16a and 16b. Equalizer variables of the reception equalizer 18a, 18b of the transceiver devices 16a, 16b on the reception side may be determined according to a received data pattern, and may be changed during the input/output of data.

The equalizer variable set by the link training is stored in the register 15a provided in the expander chip 14a. The link training in the expander chip 14a may be executed by a known method. The expander chip 14a may also perform the link training when the expander chip 14a has received an instruction to execute the link training (training instruction) from the diagnosis information collecting unit 113 of the MPU 11a. The expander chip 14a that has performed the link training by the instruction from the diagnosis information collecting unit 113 responds back with the equalizer variable set by the link training, to the MPU 11a, for example, the diagnosis information collecting unit 113 thereof.

The expander chip 14a, in this manner, has a function of a data transmission variable setting unit 142 that sets an equalizer variable according to the transmission characteristics of the transceiver device 16a (data transmission variable). The MPU 11a may be a processing device that controls the whole of the controller 10. The MPU 11a may be a multiprocessor. Instead of the MPU 11a, for example, one out of a central processing unit (CPU), a digital signal processor (DSP), an application specific integrated circuit (ASIC), a programmable logic device (PLD), or a field programmable gate array (FPGA) may be used as the processing device. Alternatively, instead of the MPU 11a, a combination of two or more types of elements out of a CPU, a MPU, a DSP, an ASIC, a PLD, and a FPGA may be used.

The MPU 11a may achieve various functions by executing an operating system (OS) and programs stored in the nonvolatile memory 13a, the memory 12a, and the like. As illustrated in FIG. 3, the MPU 11a may function as the cable information obtaining unit 111, a diagnosis reference selection unit 112, the diagnosis information collecting unit 113, and a diagnosis unit 114 by executing a diagnosis program.

The cable information obtaining unit 111 obtains unique information on the coupled communication cable 40 (cable information). For example, the cable information obtaining unit 111 requests the expander chip 14a to transmit cable information on the coupled communication cable 40 to the cable information obtaining unit 111. The cable information obtaining unit 111 stores, in a given area such as in the memory 12a, the cable information sent back from the expander chip 14a in response to the transmission request.

The cable information obtaining unit 111 may obtain the cable information on the communication cable 40 by reading a value of the register 15a of the expander chip 14a directly or indirectly, or may obtain the cable information on the communication cable 40 by modifying such information as appropriate. The diagnosis reference selection unit 112 selects the diagnosis reference information 122 corresponding to the communication cable 40 out of plural sets of diagnosis reference information 122 stored in the nonvolatile memory 13a or the like, based on the cable information on the communication cable 40 obtained by the cable information obtaining unit 111.

Figure 4:
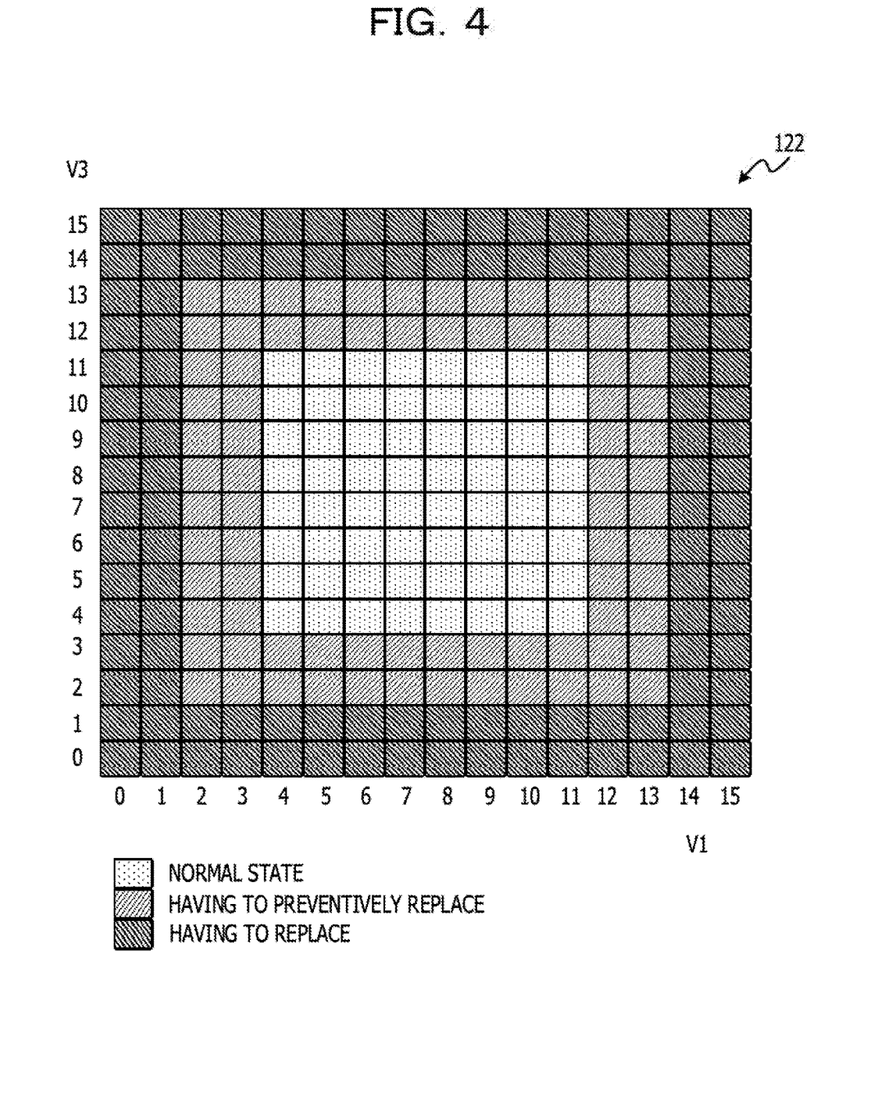
FIG. 4 illustrates an example of diagnosis reference information in the storage system.

FIG. 4 illustrates an example of diagnosis reference information in the storage system. The diagnosis reference information 122 illustrated in FIG. 4 may be used in the storage system illustrated in FIGS. 1 to 3. As illustrated in FIG. 4, in the diagnosis reference information 122, one state (soundness state information) out of three types of states, "normal state", "having to preventively replace", and "having to replace" is associated with each position in a matrix, which is a combination of two sets of equalizer variables.

The transmission equalizer 17a may be a FIR type digital filter having three taps, and the equalizer characteristics may be determined by two independent variables (V1 and V3) out of three variables (V1, V2, and V3). For example, as illustrated in the example of FIG. 4, one state (soundness state information) out of the three types of the states, "normal state", "having to preventively replace", and "having to replace" is represented by the combination of the variables V1 and V3 out of the variables V1, V2, and V3. Each of the states may represent a state of the diagnosis target path.

In FIG. 4, each of the equations $|V1|+|V2|+|V3|=64$, $V1 \leq 0$, $V2 \geq 0$, and $V3 \leq 0$ may be true. Here, "normal state" is a normal state in which maintenance work is unnecessary (good state). "Having to replace" is a state in which some kind of failure has occurred, and a maintenance work has to be performed (failure state). "Having to preventively replace" is a state in which a failure has not occurred, but is determined to be liable to occur in the near future based on an empirical rule (a failure is predicted) (failure predicted state). For example, in "having to preventively replace", a maintenance work may be performed from the preventive maintenance view point.

In this manner, in the diagnosis reference information 122, information indicating one of the soundness judgement (good state, failure state, or failure predicted state) is determined for each coordinate position corresponding to the combination of the equalizer variables V1 and V3 of the transmission equalizer 17a. The diagnosis unit 114 performs path diagnosis by obtaining soundness state information set to the position corresponding to the combination of the two equalizer variables V1 and V3 obtained from the expander chip 14a, in the diagnosis reference information 122.

For example, in FIG. 4, when V1=6 and V3=6, it is determined to be in a good state, and when V1=3 and V3=2, it is determined to be in a failure predicted state. When V1=1 and V3=0, it is determined to be in a failure state. The soundness state information in the diagnosis reference information 122 may be set, for example, by an empirical rule.

The diagnosis reference information 122 may be prepared for each type of communication cable 40 in advance. For example, plural types of diagnosis reference information 122 are stored in the nonvolatile memory 13a that respectively correspond to the cable information on plural types of communication cables 40 that may be used in the storage system 1. Diagnosis reference information 122 based on the cable information obtained by the cable information obtaining unit 111 is selected out of the plural types of diagnosis reference information 122 stored in the nonvolatile memory 13a, that corresponds to the cable information obtained.

The diagnosis information collecting unit 113 collects each of the equalizer variables (equalizer values) of the transmission equalizer 17a and the reception equalizer 18a from the expander chip 14a. For example, the diagnosis information collecting unit 113 transmits to the expander chip 14a an instruction to perform link training. The expander chip 14a sends back, to the diagnosis information collecting unit 113, the equalizer variables that have been set by the link training performed in accordance with the instruction to perform link training.

The diagnosis information collecting unit 113 stores values of the equalizer variables collected from the expander chip 14a, in the memory 12a, as the equalizer values 121. Hereinafter, collecting the respective equalizer variables (equalizer values) of the transmission equalizer 17a and the reception equalizer 18a from the expander chip 14a by the diagnosis information collecting unit 113 may be referred to as diagnosis information collecting processing.

The diagnosis unit 114 refers to the diagnosis reference information 122 that has been selected by the diagnosis reference selection unit 112, using the equalizer values 121 (equalizer variables V1 and V3) collected from the expander chip 14a by the diagnosis information collecting unit 113. The diagnosis unit 114 determines to which state the combination of the collected equalizer variables V1 and V3 corresponds out of the three types of states, "normal state", "having to preventively replace", and "having to replace". For example, the diagnosis unit 114 executes path diagnosis processing to diagnose the diagnosis target path.

The determination result may be output, for example, to a display device or the like. When the determination result corresponds to "normal state", for example, an operator is notified that the state is normal. For example, when the determination result corresponds to "having to replace", the operator is notified that a failure has occurred and a maintenance work has to be performed. At that time, the failure location may be identified, and the operator may also be notified of the identified failure location. The identification of the failure location may be achieved by various known methods, and the description thereof may be omitted.

When the determination result corresponds to "having to preventively replace", the operator is notified that a failure is likely to occur and a maintenance work is desired (failure predicted state notification). At that time, a likely failure location may be identified, and the operator may also be notified of the identified location of the predicted failure. The identification of the location of the predicted failure may be achieved by various known methods, and the description thereof may be omitted.

Various types of notification to the operator may be performed, for example, by displaying a message on a display device, by making various audio output corresponding to the notification contents, or the like. Hereinafter, the determination by the diagnosis unit 114 as to which state the combination of the collected equalizer variables V1 and V3 corresponds out of the three types of states, "normal state", "having to preventively replace", and "having to replace", with reference to the diagnosis reference information 122 using the equalizer values 121 may be referred to as the path diagnosis processing.

The IO module 20 may be a device for connecting an external device to expand functions, and may be, for example, a device enclosure in which a storage device and IO equipment are provided. The IO module 20 is coupled to the controller 10 and another IO module 20 through the communication cables 40, and transmits and receives data to and from the controller 10 and the other IO module 20.

The IO modules 20-1 to 20-4 may have configurations substantially the same as or similar to each other. As illustrated in FIG. 2, the IO module 20 includes a MPU 11b, a memory 12b, a nonvolatile memory 13b, and the expander chip 14b. The MPU 11b, the memory 12b, the nonvolatile memory 13b, and the expander chip 14b may respectively have configurations that are substantially the same as or similar to those of the MPU 11a, the memory 12a, the nonvolatile memory 13a, and the expander chip 14a of the controller 10.

For example, diagnosis reference information 122 may be stored in the nonvolatile memory 13b, similarly to the nonvolatile memory 13a. For example, as illustrated in FIG. 2, the expander chip 14b includes the transceiver device 16b and a register 15b. The transceiver device 16b and the register 15b may respectively have functions that are substantially the same as or similar to those of the transceiver device 16a and the register 15a provided in the expander chip 14a of the controller 10.

For example, the expander chip 14a may have a function of the cable information notification unit 141 and the data transmission variable setting unit 142 in addition to a function to implement link training, and the like. The equalizer value 121 is stored in the memory 12b, and plural sets of diagnosis reference information 122 are stored in the nonvolatile memory 13b respectively associated with cable information on plural types of communication cables 40 with a possibility to be used in the storage system 1.

As illustrated in FIG. 3, similarly to the MPU 11a, the MPU 11b may function as the cable information obtaining unit 111, the diagnosis reference selection unit 112, the diagnosis information collecting unit 113, and the diagnosis unit 114 by executing a control program. Hereinafter, an example is illustrated in which the path diagnosis processing is executed in the controller 10 for the communication path to the IO module 20.

Figure 5:
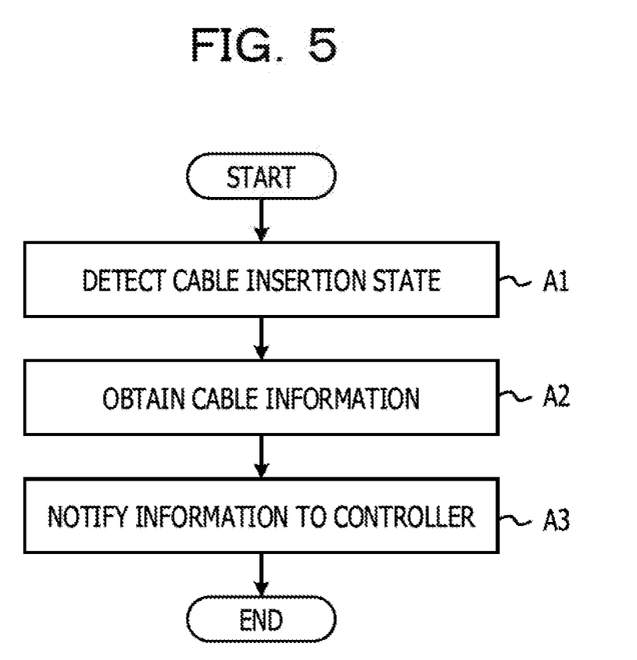
FIG. 5 illustrates an example of processing for obtaining cable information on a communication cable in an expander chip of the storage system.

FIG. 5 illustrates an example of processing for obtaining cable information on the communication cable in the expander chip of the storage system. Processing for obtaining cable information on the communication cable 40 in the expander chip 14 of the above-described storage system 1 is described with reference to Operations A1 to A3 illustrated in FIG. 5. The processing illustrated in FIG. 5 is initiated, for example, triggered by turning on the DC power source of the device or by removal and insertion of the connector of the communication cable 40 accompanying replacement processing of the communication cable 40.

In Operation A1, the expander chip 14 detects a state in which the connector of the communication cable 40 is inserted into the connector of the transceiver device 16. In Operation A2, the expander chip 14 obtains cable information (serial number) by reading the cable information from the ROM of the communication cable 40. In Operation A3, the expander chip 14, for example, the cable information notification unit 141 thereof notifies the controller 10, for example, the cable information obtaining unit 111 thereof of the cable information on the communication cable 40, and the processing ends.

Figure 6:
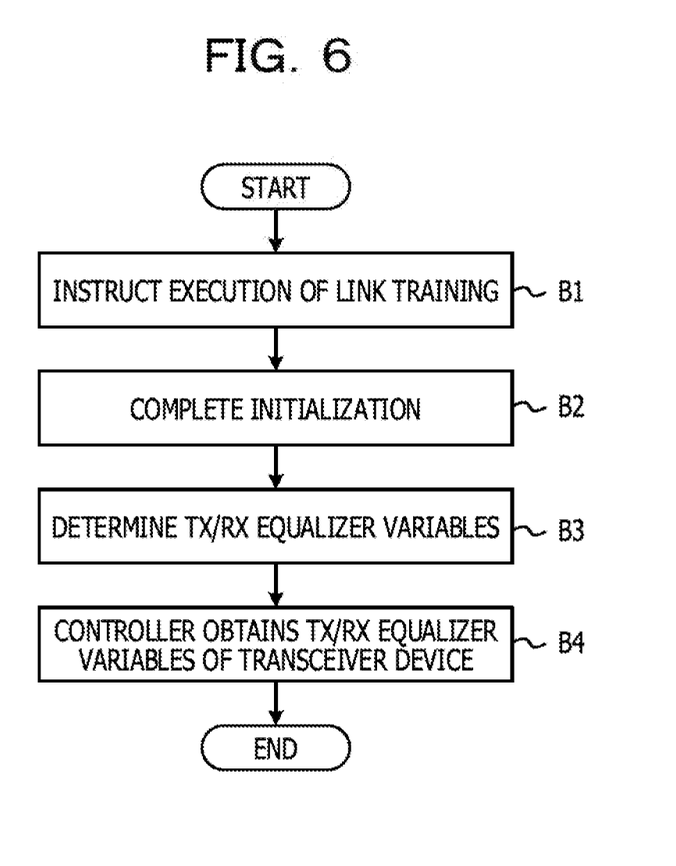
FIG. 6 illustrates an example of diagnosis information collecting processing by a diagnosis information collecting unit of the storage system.

FIG. 6 illustrates an example of the diagnosis information collecting processing by the diagnosis information collecting unit of the storage system. Processing for collecting equalizer variables (diagnosis information collecting processing) by the diagnosis information collecting unit 113 of the storage system 1 is described with reference to Operations B1 to B4 illustrated in FIG. 6. In Operation B1, the diagnosis information collecting unit 113 transmits an instruction to execute link training to the expander chip 14, for example, the data transmission variable setting unit 142 thereof.

In Operation B2, the expander chip 14, for example, the data transmission variable setting unit 142 thereof performs the link training. In the link training, due to the transceiver device 16a of the controller 10 and the transceiver device 16b of the IO module 20 that is a communication destination transmitting waveforms to each other after equalizer variables of the transmission equalizer 17 and the reception equalizer 18 have been initialized, the equalizer variables on the transmission side is determined according to the transmission path characteristics.

In Operation B3, the controller 10, for example, the diagnosis information collecting unit 113 thereof obtains the equalizer variables of the transmission equalizer 17 and the reception equalizer 18 of the transceiver device 16. In Operation B4, the diagnosis information collecting unit 113 stores the obtained equalizer variables in a given area in the memory 12a, as the equalizer values 121, and the processing ends. In this manner, the equalizer variables that have been collected by the diagnosis information collecting unit 113 are used for the path diagnosis processing by the diagnosis unit 114.

Figure 7:
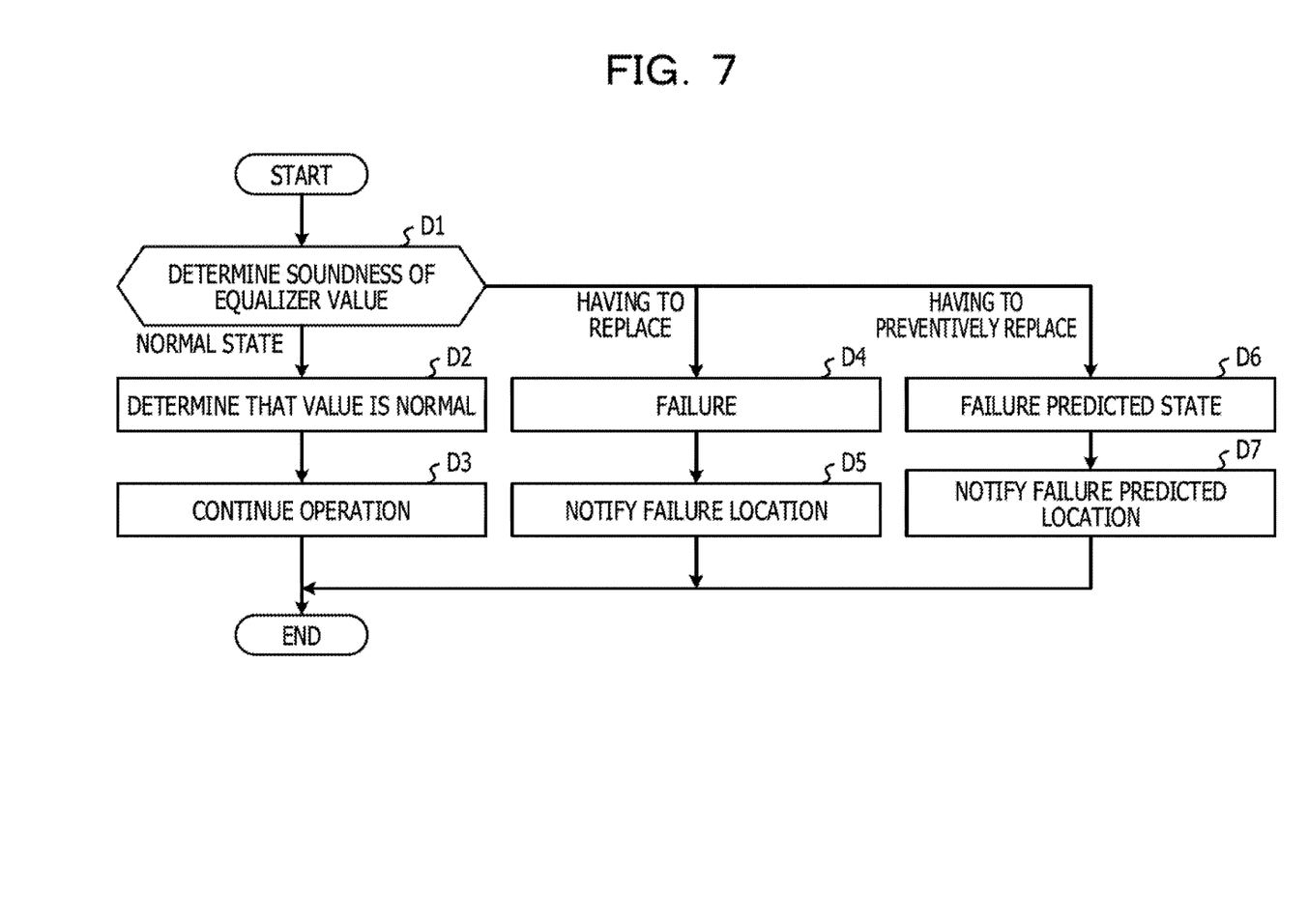
FIG. 7 illustrates an example of path diagnosis processing by a diagnosis unit of the storage system.

FIG. 7 illustrates an example of the path diagnosis processing by the diagnosis unit of the storage system. The path diagnosis processing by the diagnosis unit 114 of the storage system 1 may correspond to Operations D1 to D7 illustrated in FIG. 7. In Operation D1, the diagnosis unit 114 reads the equalizer values 121 stored in the memory 12. The diagnosis unit 114 reads, from the nonvolatile memory 13, diagnosis reference information 122 that has been associated with the cable information on the communication cable 40, which had been obtained by the cable information obtaining unit 111.

The diagnosis unit 114 checks to which state the combination of the variables V1 and V2 of the equalizer values 121 corresponds, out of, "normal state", "having to preventively replace", and "having to replace", with reference to the diagnosis reference information 122, based on the combination of the variables V1 and V2 of the equalizer values 121. As the result of the checking, when the combination of the variables V1 and V2 corresponds to "normal state" (see "normal state" in Operation D1), the processing proceeds to Operation D2.

In Operation D2, the diagnosis unit 114 determines that the communication path is normal, and in Operation D3, the storage system 1 continues to operate, and then the processing ends. In addition, when the combination of the variables V1 and V2 corresponds to "having to replace" (see "having to replace" in Operation D1) as the result of the checking, the processing proceeds to Operation D4. In Operation D4, the diagnosis unit 114 determines that some kind of failure has occurred in the communication path, and in Operation D5, the operator is notified of a failure location. The processing then ends.

When the combination of the variables V1 and V2 corresponds to "having to preventively replace" as a result of the checking (see "having to preventively replace" in Operation D1), the processing proceeds to Operation D6. Operation D6 corresponds to a state in which a failure has not occurred in the communication path, but is determined to be liable to occur in the near future based on an empirical rule (failure predicted). In Operation D7, the operator is notified of a location at which a failure is predicted to occur. The processing then ends.

Figure 8:
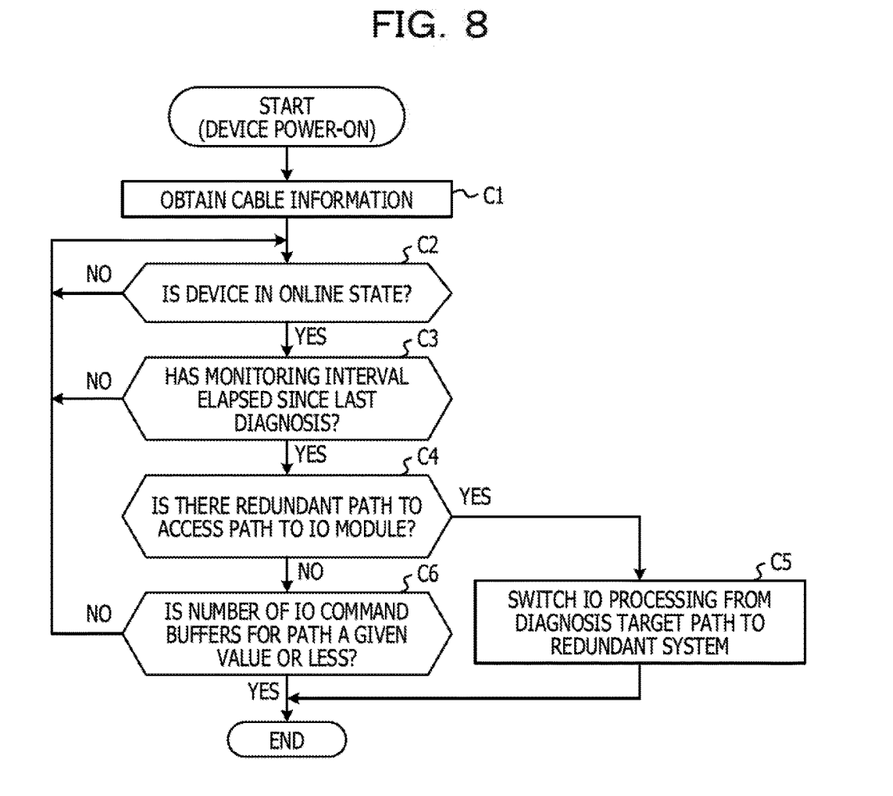
FIG. 8 illustrates an example of execution timings of the diagnosis information collecting processing and the path diagnosis processing in the storage system.

FIG. 8 illustrates an example of execution timing of the diagnosis information collecting processing and the path diagnosis processing in the storage system. Timing at which the above-described diagnosis information collecting processing illustrated in FIG. 6 and path diagnosis processing illustrated in FIG. 7 are executed in the storage system 1 is described with reference to Operations C1 to C6 illustrated in FIG. 8. When the power source of the storage system 1 is turned on (device powered on), in Operation C1, the cable information obtaining unit 111 obtains cable information on the communication cable 40 coupled through the expander chip 14.

In Operation C2, the diagnosis information collecting unit 113 checks whether the device (controller 10) and the IO module 20 are in the state coupled to each other through the communication cable 40 (online state). When the checking result indicates the online state between the device (controller 10) and the IO module 20 (YES in Operation C2), the processing proceeds to Operation C3. In Operation C3, the diagnosis information collecting unit 113 checks whether a given time period (monitoring interval) has elapsed since the last path diagnosis processing by the diagnosis unit 114.

When the monitoring interval has elapsed (see YES in Operation C3), the processing proceeds to Operation C4. In Operation C4, the diagnosis information collecting unit 113 checks whether there is a redundant path to the access path to the IO module 20. When there is no redundant path to the access path to the IO module 20 (see NO in Operation C4), the processing proceeds to Operation C6.

In Operation C6, whether or not the number of IO command buffers with the diagnosis target path is a given threshold value or less is checked. When, as a result, the number of IO command buffers with the diagnosis target path is the given threshold value or less (see YES in Operation C6), the diagnosis information collecting processing (see FIG. 6) and the path diagnosis processing (see FIG. 7) are executed. This is to reduce an influence on IO processing from the path diagnosis processing.

When the number of IO command buffers with the diagnosis target path exceeds the given threshold value (see NO in Operation C6), the processing returns to Operation C2. When, as a result of the checking in Operation C2, the device is not in an online state (NO in Operation C2), or when the monitoring interval has not elapsed as a result of the checking in Operation C3 (see NO in Operation C3), the processing also returns to Operation C2.

As a result of the checking in Operation C4, when there is a redundant path to the access path to the IO module 20 (see YES in Operation C4), the controller 10 switches the IO processing for the diagnosis target path, such that the IO processing passes through the redundant path. The controller 10, for example, removes the IO processing through the diagnosis target path by having the IO processing passing through the redundant path. This may allow the path diagnosis processing to be executed without affecting the IO processing.

The diagnosis information collecting processing (see FIG. 6) and the path diagnosis processing (see FIG. 7) are then executed for the diagnosis target path from which the IO processing has been removed. In this manner, in the storage system 1, the diagnosis information collecting unit 113 obtains equalizer variables of the transmission equalizer 17 and the reception equalizer 18 from the transceiver device 16 (expander chip 14) on the diagnosis target path, and the diagnosis unit 114 executes the path diagnosis processing using the obtained equalizer variables.

Therefore, the path diagnosis may be allowed to be executed while the IO processing is executed in the online state. The path diagnosis, for example, may be performed without affecting the operation of the system for the business or the like. The diagnosis unit 114 determines to which state the diagnosis target path corresponds, out of, "normal state", "having to preventively replace", and "having to replace", with reference to the diagnosis reference information 122, based on the equalizer variables that have been obtained from the transceiver device 16.

The diagnosis unit 114 not only determines whether the diagnosis target path corresponds to "normal state" or "having to replace", but also determines whether the diagnosis target path corresponds to "having to preventively replace" or not. This provides a high level of utility as a failure-predicted state is determined, and an occurrence of a failure, for example, is predicted. Determination of a predicted failure, for example, may allow a maintenance work to be performed at a given timing before a failure actually occurs, such that an occurrence of a failure may be preempted, improving the reliability.

Respective sets of diagnosis reference information 122 for each type of the communication cables 40 are prepared, and the diagnosis reference selection unit 112 selects the diagnosis reference information 122 according to the communication cable 40, based on the cable information on the communication cable 40 obtained by the cable information obtaining unit 111. This may allow the diagnosis unit 114 to perform a path diagnosis using the diagnosis reference information 122 optimal for the communication path, improving the accuracy of the path diagnosis.

The technology disclosed above is not limited to the above-described embodiments, and various modification may be implemented without departing from the scope of the technology disclosed herein. For example, the path diagnosis processing in the controller 10, executed with respect to the communication path between the controller 10 and the IO module 20, is not limited thereto. For example, the IO module 20 may similarly execute the path diagnosis processing with respect to a communication path between the IO module 20 and another IO module 20.

The number and the configuration of controllers 10 and IO modules 20 are not limited to the example illustrated in FIG. 1, and may be changed as appropriate. For example, the expander chip 14a executes the processing for determining the variable of the transmission equalizer 17, and the diagnosis unit 114 executes the path diagnosis processing with reference to the diagnosis reference information 122 using an equalizer variable of the transmission equalizer 17, but the embodiment is not limited thereto.

For example, the expander chip 14 may set an equalizer variable of the reception equalizer 18 by link training, and the diagnosis unit 114 may execute the path diagnosis processing using the equalizer variable of the reception equalizer 18. The reception equalizer 18 may be a FIR filter having n taps. For example, the reception equalizer 18 has n (here, n is an integer) variables, and stores soundness determination information in an information table for each combination of values each variable may assume.

The controller 10 functions as the diagnosis device to perform diagnosis for a data transmission path coupled to the IO module 20, but the embodiment is not limited thereto. For example, the IO module 20 may function as a diagnosis device to perform diagnosis for a data transmission path coupled to the controller 10 or another IO module 20, by executing processing similar to the processing of the controller 10.

The diagnosis reference information 122 is not limited to the combination of the equalizer variables V1 and V3 illustrated in FIG. 4, and various modifications may be implemented. For example, the diagnosis unit 114 may perform soundness determination using three or more equalizer variables obtained from the expander chips 14a, 14b.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A diagnosis device comprising:
   a processor that executes a diagnosis program; and
   a memory that stores the diagnosis program, wherein the processor, based on the diagnosis program, performs operations to:
      collect a data transmission variable set by a data transmission path characteristics from a transceiver device on a diagnosis target path;
      obtain cable information on a communication cable coupled to the transceiver device;
      select, as diagnosis reference information includes a value of the data transmission variable and determination information associated with each other, diagnosis reference information corresponding to the obtained cable information out of plural diagnosis reference information stored in a storage device; and
      perform diagnosis for the diagnosis target path with reference to the selected diagnosis reference information, based on the collected data transmission variable.

2. The diagnosis device according to claim 1, wherein the processor:
   instructs the transceiver device to set the data transmission variable; and
   collects the data transmission variable set in accordance with the instruction.

3. The diagnosis device according to claim 1, wherein the transceiver device includes an equalizer, and the data transmission variable is an equalizer variable.

4. The diagnosis device according to claim 3, wherein the diagnosis reference information includes a correspondence between a combination of equalizer variables and a state of the diagnosis target path corresponding to the determination information.

5. A diagnosis method comprising:
   collecting, by a computer, a data transmission variable set by a data transmission path characteristics from a transceiver device on a diagnosis target path;
   obtaining cable information on a communication cable coupled to the transceiver device;
   selecting, as diagnosis reference information that includes a value of the data transmission variable and determination information associated with each other, diagnosis reference information corresponding to the obtained cable information out of plural diagnosis reference information stored in a storage device; and performing diagnosis for the diagnosis target path with reference to the selected diagnosis reference information, based on the collected data transmission variable.

6. The diagnosis method according to claim 5, further comprising:

instructing the transceiver device to set the data transmission variable; and collecting the data transmission variable set in accordance with the instruction.

7. The diagnosis method according to claim 5, wherein the transceiver device includes an equalizer, and the data transmission variable is an equalizer variable.

8. A non-transitory recording medium storing diagnosis program which causes a computer to perform operations of:

collecting a data transmission variable set by a data transmission path characteristics from a transceiver device on a diagnosis target path;

obtaining cable information on a communication cable coupled to the transceiver device;

selecting, as diagnosis reference information that includes a value of the data transmission variable and determination information associated with each other, diagnosis reference information corresponding to the obtained cable information out of plural diagnosis reference information stored in a storage device; and performing diagnosis for the diagnosis target path with reference to the selected diagnosis reference information, based on the collected data transmission variable.

9. The diagnosis method according to claim 7, wherein the diagnosis reference information includes correspondence between a combination of equalizer variables and a state of the diagnosis target path corresponding to the determination information.

10. The non-transitory recording medium according to claim 8, further comprising:

instructing the transceiver device to set the data transmission variable; and collecting the data transmission variable set in accordance with the instruction.

11. The non-transitory recording medium according to claim 8, wherein the transceiver device includes an equalizer, and the data transmission variable is an equalizer variable.

12. The non-transitory recording medium according to claim 11, wherein the diagnosis reference information includes a correspondence between a combination of equalizer variables and a state of the diagnosis target path corresponding to the determination information.

* * * * *